(12) United States Patent
Edelson

(10) Patent No.: US 8,299,673 B2
(45) Date of Patent: Oct. 30, 2012

(54) ASPECTS OF WINDING SYMMETRY IN HPO MOTOR DESIGN

(75) Inventor: Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 168 days.

(21) Appl. No.: 12/008,227

(22) Filed: Jan. 9, 2008

(65) Prior Publication Data
US 2008/0179981 A1 Jul. 31, 2008

Related U.S. Application Data

(60) Continuation-in-part of application No. 11/630,293, filed as application No. PCT/US2005/022011 on Jun. 21, 2005, and a continuation-in-part of application No. 11/029,978, filed on Jan. 4, 2005, now Pat. No. 7,116,019, which is a division of application No. 10/132,936, filed on Apr. 26, 2002, now Pat. No. 6,838,791, and a continuation-in-part of application No. 09/713,654, filed on Nov. 15, 2000, now Pat. No. 6,657,334.

(60) Provisional application No. 60/879,647, filed on Jan. 9, 2007, provisional application No. 60/900,538, filed on Feb. 9, 2007, provisional application No. 60/581,789, filed on Jun. 21, 2004, provisional application No. 60/286,862, filed on Apr. 26, 2001.

(51) Int. Cl.
*H02K 17/00* (2006.01)

(52) U.S. Cl. ....................................................... 310/166
(58) Field of Classification Search .................. 310/268, 310/166
See application file for complete search history.

(56) References Cited

U.S. PATENT DOCUMENTS

| | | | | |
|---|---|---|---|---|
| 2,737,604 | A * | 3/1956 | Cole | 310/164 |
| 3,697,842 | A * | 10/1972 | Morrill | 318/781 |
| 4,095,161 | A * | 6/1978 | Heine et al. | 318/696 |
| 4,260,923 | A * | 4/1981 | Rawcliffe | 310/184 |
| 4,339,679 | A * | 7/1982 | Urschel | 310/49.34 |
| 4,363,985 | A * | 12/1982 | Matsuda et al. | 310/184 |
| 4,481,440 | A * | 11/1984 | Muller | 310/268 |
| 6,369,481 | B1 * | 4/2002 | Bahn | 310/166 |
| 6,411,005 | B1 * | 6/2002 | Strangas et al. | 310/216.001 |
| 6,486,576 | B1 * | 11/2002 | Yura et al. | 310/49.24 |

* cited by examiner

*Primary Examiner* — Dang Le

(57) ABSTRACT

A high phase order induction machine wound and permitted by coil symmetry to operate at fewer than the magnetically optimal number of poles is constrained by symmetry to be a two pole machine and be capable of operating on odd harmonics only, but with back-iron, end rings, and rotor core optimized for 10 pole operation, might be used normally in '5th harmonic' mode, with '7th harmonic' utilized to engage the 'mesh effect'. Such a machine thus appears to be operating in the '1.4 harmonic'. A high phase order induction machine driven by a second harmonic drive, in which a symmetry imposed by full span windings is broken. This may be most simply accomplished through the use of short pitch windings. Other possible approaches include using non-wound slot drive, and using toroidal windings which localize coils to individual slots.

15 Claims, 5 Drawing Sheets

ASPECTS OF WINDING SYMMETRY IN HPO MOTOR DESIGN

CROSS-REFERENCE TO RELATED APPLICATIONS

This application claims the benefit of U.S. Provisional Patent Application Nos. 60/879,647, filed Jan. 9, 2007, and 60/900,538, filed Feb. 9, 2007. This application is also a Continuation-in-Part of U.S. patent application Ser. No. 11/630,293, filed Dec. 19, 2006, which is the U.S. national stage application of International Application No. PCT/US2005/022011, filed Jun. 21, 2005, which international application was published on Jan. 5, 2006, as International Publication WO2006/002207 in the English language. The International Application claims the benefit of Provisional Patent Application No. 60/581,789, filed Jun. 21, 2004 and is a Continuation-in-part of U.S. patent application Ser. No. 11/029,978, filed Jan. 4, 2005 now U.S. Pat. No. 7,116,019, which is a Divisional of U.S. patent application Ser. No. 10/132,936 filed Apr. 26, 2002 now U.S. Pat. No. 6,838,791, and which claims the benefit of U.S. Provisional App. No. 60/286,862 filed Apr. 26, 2001 now U.S. Pat. No. 6,657,334. U.S. patent application Ser. No. 10/132,936 is a Continuation-in-part of U.S. patent application Ser. No. 09/713,654, filed Nov. 15, 2000. The above-mentioned documents are incorporated herein by reference in their entirety.

BACKGROUND OF THE INVENTION

The present invention relates to high phase order induction machines.

The AC induction motor has been known for 120 years, and high phase order (HPO) induction motors have been in research since the 1970. In this time, the induction motor has become the workhorse of industry. Basic analysis of induction motor systems generally centers upon the development of good equivalent circuit models of the machine. One of the basic simplifying treatments is to assume a 'fully sinusoidal distributed winding'. For the purpose of the following discussion, such analysis will be taken as a given and not developed. Rather than focusing upon the rotating magnetic field and its interaction with the rotor and the stator windings, this disclosure will focus upon the rotating distribution of current flowing through the stator windings.

This rotating current distribution may be described as a superposition of rotating sinusoidal current distributions, each of which is subject to standard analysis as necessary. Thus the focus of this disclosure is the generation of the rotating current distribution, limits to the allowable rotating current distributions in high phase order motors, and defects in the actual rotating current distributions produced.

High phase order motors share most of the technology and design methodologies of conventional three phase motors. For example, the equations relating flux per pole, effective number of series turns, frequency, and voltage placed across the winding are exactly the same. With a few simple adaptations, tools used to design three phase motors may be used for HPO designs. The significant difference is that an HPO motor uses a larger number of electrically independent coils, driven by a larger number of differently phased sources. Derived from this core change are secondary changes in things such as desirable winding distribution, chording, number of turns per coil, etc.

The primary impetus for research into HPO motors has been to reduce the deleterious effects of drive harmonics on motor efficiency. Research into mesh connected HPO machines extends this to the intentional use of drive harmonics to enhance the use of inverter power electronics.

Briefly touching on the rotating magnetic field, in the ideal case the rotating magnetic field acts as a fixed distribution rotating about the axis of the motor. This implies that in the ideal case the current distribution must also have a fixed structure rotating about the axis of the motor. This ideal requires that current be defined at each and every position around the stator, and is thus not physically realizable. Real motors are built with finite numbers of stator conductors, usually localized in a smaller number of slots.

The 'sampling theorem' provides the means to deal with this situation.

This concept, well known in the field of digitized audio systems, simply states that a bandwidth limited continuous signal may be faithfully represented by a discrete sampling at sufficient but finite frequency. For example, a 0 to 20 kHz continuous audio signal may be faithfully represented by taking samples at a rate greater than 40 kHz. The continuous signal f(t) is present at an infinite number of 'points in time', however it may be faithfully represented and reconstructed from a sampled signal f(n), where the values are only known only at the ends of a finite number if intervals in time.

As applied to motor windings, one needs consider the distribution of current flow on the stator. This current distribution is a signal in space rather than in time, sampled by the stator windings. The stator winding, with its distribution in space and its magnetic coupling across the entire stator is in essence the 'reconstruction filter' required to apply the sampling theorem. The samples of the current distribution are themselves continuous time series, and this two-dimensional reconstruction in circumferential position and time creates the rotating current distribution.

The analysis of the rotating current distribution developed is most simply performed when the drive current time series consists of sinusoidal currents, where each supply leg produces an alternating current of the same amplitude and frequency, but with different phase. For the analysis of real non-sinusoidal drive current, the approach is to decompose the real current into a set of sinusoidal drive currents by harmonic analysis, analyze each separate sinusoidal component, and then sum the resultant single frequency rotating current distributions into a composite.

The nature of the sampling theorem requires a bandwidth limited signal. This means that frequencies present must lie within a specified limited range. Any frequency that is outside of this range will be aliased into the allowed limited range. When a signal outside of the representable range is sampled, and the resulting samples 'reconstructed' into a continuous signal, the output of the reconstruction must be within the allowable range. In the case of motor windings, the bandwidth limiting means spatial bandwidth limiting, in other words limits to the shape of the rotating current distribution.

As generally applied, the sampling theorem is used to describe time series where the duration of the series is much longer than the sampling interval. In the present application, the stator is circular, and thus both finite yet unbounded, and the current distribution reconstructed from the sampling is periodic, with a period constrained to the circumference. This greatly simplifies the analysis, a finite number of sample points are mapped onto a limited set of basis functions.

Harmonics present in drive current are equivalent to values sampled from a rotating current distribution with higher pole count fields present. These harmonic components not only have frequency values which are multiples of the fundamental drive current frequency, but these components have time displacement values which are the same as the fundamental time displacement value. Referred to the period of the harmonic component in question, the phase angle displacement is a multiple of the fundamental phase angle displacement.

In a conventional three phase stator winding, three values of current flow are defined by the external drive. These three values are distributed across the stator by the winding, and reconstruct a quite reasonable current distribution. However the three sample points restrict the possible bandwidth of the reconstruction. Any harmonics present in the drive current will reconstruct rotating current distributions which are restricted to those represented by the winding.

As a qualitative description, consider a two pole stator winding with a total of 6 phase bands. These carry the three phases and their respective inverses. Harmonic currents in the drive result in the following phase angle distributions about the stator:

TABLE 1 a two pole stator winding with a total of 6 phase bands

| LEG | Harmonic | | | | | | |
|---|---|---|---|---|---|---|---|
|  | 1x | 2x | 3x | 4x | 5x | 6x | 7x |
| A | 0 | 0 | 0 | 0 | 0 | 0 | 0 |
| C' | 60 | 300 | 180 | 60 | 300 | 180 | 60 |
| B | 120 | 240 | 0 | 120 | 240 | 0 | 120 |
| A' | 180 | 180 | 180 | 180 | 180 | 180 | 180 |
| C | 240 | 120 | 0 | 240 | 120 | 0 | 240 |
| B' | 300 | 60 | 180 | 300 | 60 | 180 | 300 |

As may be simply observed, such a two pole winding can only develop a two pole rotating current distribution. Triplen harmonic currents will develop a stationary current distribution, however circuit arrangement will generally dictate that triplen harmonic currents cannot actually enter the machine. In this regard, Triplen is a technical term referring to harmonics which are odd multiples of three, and do not enter three phase machines. Similarly, most of the circumstances that create harmonics create far more odd order harmonics than even order harmonics.

Each harmonic is 'excited' by alternating current at the fundamental frequency multiplied by the harmonic order. Thus the standard results that 6n−1 harmonics result in contra-rotating current distributions, and that 6n+1 harmonics rotate in the forward direction, both at much higher speeds than the fundamental field.

Continuing the above example, consider a 9 phase stator in similar circumstances. This simplified example stator uses a full span coils, and has a total of 18 phase bands. Drive current is evenly distributed, with 40 degree phase difference between adjacent phases.

TABLE 2 a 9 phase stator having full span coils with a total of 18 phase bands

| LEG | Harmonic | | | | | | | | | | |
|---|---|---|---|---|---|---|---|---|---|---|---|
|  | 1x | 2x | 3x | 4x | 5x | 6x | 7x | 8x | 9x | 10x | 11x |
| A | 0 | 0 | 0 | 0 | 0 | 0 | 0 | 0 | 0 | 0 | 0 |
| F' | 20 | 220 | 60 | 260 | 100 | 300 | 140 | 340 | 180 | 20 | 220 |
| B | 40 | 80 | 120 | 160 | 200 | 240 | 280 | 320 | 0 | 40 | 80 |
| G' | 60 | 300 | 180 | 60 | 300 | 180 | 60 | 300 | 180 | 60 | 300 |
| C | 80 | 160 | 240 | 320 | 40 | 120 | 200 | 280 | 0 | 80 | 160 |
| H' | 100 | 20 | 300 | 220 | 140 | 60 | 340 | 260 | 180 | 100 | 20 |
| D | 120 | 240 | 0 | 120 | 240 | 0 | 120 | 240 | 0 | 120 | 240 |
| J' | 140 | 100 | 60 | 20 | 340 | 300 | 260 | 220 | 180 | 140 | 100 |
| E | 160 | 320 | 120 | 280 | 80 | 240 | 40 | 200 | 0 | 160 | 320 |
| A' | 180 | 180 | 180 | 180 | 180 | 180 | 180 | 180 | 180 | 180 | 180 |
| F | 200 | 40 | 240 | 80 | 280 | 120 | 320 | 160 | 0 | 200 | 40 |
| B' | 220 | 260 | 300 | 340 | 20 | 60 | 100 | 140 | 180 | 220 | 260 |
| G | 240 | 120 | 0 | 240 | 120 | 0 | 240 | 120 | 0 | 240 | 120 |
| C' | 260 | 340 | 60 | 140 | 220 | 300 | 20 | 100 | 180 | 260 | 340 |
| H | 280 | 200 | 120 | 40 | 320 | 240 | 160 | 80 | 0 | 280 | 200 |
| D' | 300 | 60 | 180 | 300 | 60 | 180 | 300 | 60 | 180 | 300 | 60 |
| J | 320 | 280 | 240 | 200 | 160 | 120 | 80 | 40 | 0 | 320 | 280 |
| E' | 340 | 140 | 300 | 100 | 260 | 60 | 220 | 20 | 180 | 340 | 140 |
| Poles | 2 | 14 | 6 | 10 | 10 | 6 | 14 | 2 | 18 | 2 | 14 |
| Direction | − | + | − | + | − | + | − | NR | + | − |  |
| adj diff | 20 | −140 | 60 | −100 | 100 | −60 | 140 | −20 | 20 |  | −140 |

Several features of the rotating current distribution become quickly apparent once harmonics in the HPO stator are considered. First is that the 3rd, 5th, and 7th harmonics produce synchronous rotating current distributions, that is current distributions where the pole count is scaled with the harmonic order, and which thus rotate at the same speed as the fundamental current distribution. Second, the use of full span windings results in nearly pathological results for low even order harmonics. This interaction between winding span and even order harmonics will be expanded below.

Generally, adding phases permits harmonic current flows to construct harmonic rotating current distributions that carry higher frequency spatial components, permitting such harmonic rotating drive currents to beneficially drive the rotating machine.

It is common practice to use short pitch, distributed windings. These offer several significant benefits, in particular reducing the magnitude of spatial harmonic fields produced by the windings, reducing length in the end turns, and more evenly distributing the stator windings about the circumference of the stator. Winding distribution is quite simply a low pass filter technique, applied to the current distribution. This low pass filter more strongly impacts high frequency components of the rotating current distribution, selectively reducing spatial harmonic content.

When winding distribution is applied to high phase order windings, this low pass filtering effects both those spatial harmonics in the magnetic field structure which are inherent to the coils themselves, as well as any current distribution harmonics reconstructed by the several sampling points. The smoothing/low pass filtering means that the magnetic flux produced by a given amount of harmonic current flow is reduced, or in other words the inductance of the machine to these harmonic current flows. Winding distribution must be used cautiously when harmonic components are present in the drive current, as significant harmonic current may flow without producing any useful output.

Voltage is only defined between one location and another, generally two nodes of a circuit. Given a circuit of N nodes, N−1 voltage measurements are sufficient to define the relative potential of all of the nodes, and thus to completely determine the N*(N−1)/2 voltage measurements possible between any two nodes. Often because of system symmetry, many of these voltages will have the same magnitude, and be discussed in general terms. For example, in three phase systems we discuss line-line (V_ll) and line-neutral (V_ln) voltage.

Owing to the shared DC rail and internal circulating current, inverters may be considered wye connected sources, with a well defined phase to neutral voltage. When supplying a mesh connected load, the load voltage is given by:

V_ll=V_ln*2*sin(/phi/2)

where /phi is the phase angle difference between connected phases. For conventional three phase systems, /phi is 120 degrees, and V_ll=V_ln*1.732.

In high phase order systems, the V_ll will be anywhere between 0 and 2 times V_ln.

As previously noted, given an HPO machine of sufficient phase count, harmonic drive currents will develop rotating current distributions which are synchronous with the fundamental rotating current distribution. Drive currents with phase angle difference similar to those of synchronized harmonics will produce rotating current distributions that may be used to operate the motor.

Changing between operation on one allowed harmonic to another results in a different phase angle difference /phi being placed across the motor windings. This results in a different relationship between V_ll and V_ln, in essence changing the effective number of series turns that the motor winding presents to the inverter. This may be used, for example, to increase the machine impedance, raise the required terminal voltage, and reduce the required drive current for low speed high torque operations.

Losses associated with maintaining an electromagnet are proportional to the circumference of the excitation coils. However the flux created by the excitation current scales as the cross section of the magnetic poles. Because circumference is proportional to the linear dimension, whereas cross section is proportional to the square of the linear dimension, as magnetic poles get larger the total flux maintained by a given amount of loss increases. In a given machine with fixed winding structure, this becomes quickly apparent; magnetizing losses tend to increase as pole count increases. This is somewhat mitigated by reduction in stator core losses, however in general a given machine becomes less efficient when operated in 'harmonic' mode with multiplied pole count. It is therefore desirable, when using 'harmonic operation' to use the smallest change in pole count.

BRIEF SUMMARY OF THE INVENTION

A high phase order induction machine able to develop a minimum number of poles, N, permitted by coil symmetry, and a magnetically optimal number of poles for operation, X*N, is disclosed (N and X are integers and 1<X). Thus the present invention discloses a high phase order induction machine that is wound and permitted by coil symmetry to operate at fewer than the magnetically optimal number of poles. The machine is also able to develop Y*N poles for mesh operation (Y is an integer and X<Y). Thus the machine operates optimally whilst running on the Xth harmonic with Yth harmonic utilized to engage the mesh effect. Such a machine thus appears to be operating in the Y/Xth harmonic.

The present invention thus comprises specific beneficial winding configurations of previously disclosed high phase order star and mesh connected machines. In particular, a 72 slot, 18 phase toroidal machine. This winding has 4 pole symmetry, however the stator is optimized for 12 pole operation, and the machine is only operated using 3rd or 5th harmonic. Effective operation harmonic is 5/3, with a 2.53:1 harmonic mesh effect.

A high phase order induction machine driven by a second harmonic drive is also disclosed, in which a symmetry imposed by full span windings is broken. This may be most simply accomplished through the use of short pitch windings. Other possible approaches include using non-wound slot drive, and using toroidal windings which localize coils to individual slots.

Thus a 120 degree span winding will show good winding factor for both fundamental and second harmonic.

Pitches longer than 120 degrees will increase the fundamental pitch factor but decrease the second harmonic pitch factor, similarly pitches shorter than 120 degrees will improve second harmonic pitch factor at the cost of fundamental pitch factor. An extremely short pitch of 90 degrees would result in unity pitch factor for second harmonic, but only 71% pitch factor for fundamental, potentially beneficial if operation in second harmonic mode is the normal operating mode.

A second specific winding is disclosed, a 9 phase 18 slot 2 pole winding, in which each phase coil has a span of 120 degrees, and each phase comprises two half slot coils set into adjacent slot pairs. This winding permits the use of second harmonic by the use of the short pitch, but does not require a doubling of the number of inverter phases from that required by a full pitch machine. This winding may be generalized to any stator with 18*n slots an 2*n fundamental poles, and is capable of operation on fundamental or second harmonic.

Both of these windings may be generalized using a greater number of phases and slots per pole, a greater number of poles where the configuration of each pole pair is similar to those of the specified 2 pole winding.

DETAILED DESCRIPTION OF THE INVENTION

The invention is intended to include a high phase order induction machine comprising any feature described herein, either individually or in combination with any other feature, in any configuration, as well as a process to operate a high phase order induction machine comprising any process described herein, in any order, using any modality.

In a first embodiment of the invention, a high phase order induction machine is disclosed, which operates with 'fractional harmonics' as defined below in this section. Such a machine might be used normally in '5th harmonic' mode, with '7th harmonic' utilized to engage the 'mesh effect'. Such a machine would appear to be operating in the '1.4 harmonic'.

Figure 1:
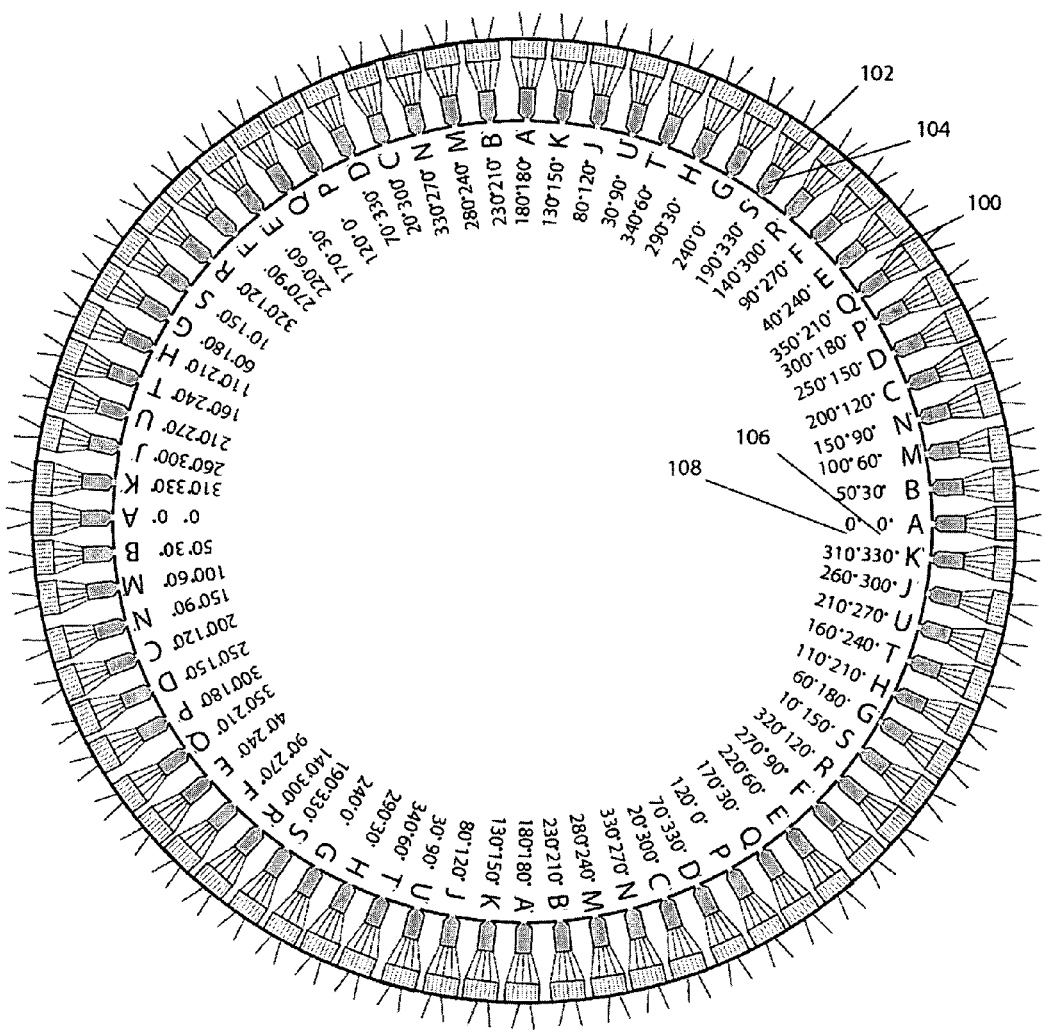
FIG. 1 shows an 18 phase 72 slot toroidally wound machine, supplied with a fundamental drive, as in the first embodiment.

This aspect of the invention may be better understood by referring to FIG. 1, which shows a stator 100 having 72 slots 104, toroidal windings 102, and 18 phases labeled A to U. The meaning of a toroidal machine is defined below in this section. In this machine, the winding has 4-pole symmetry, but the stator is optimized for 12-pole operation. In other words the minimum number of poles permitted by winding constraints (four) is less than the optimum number of poles for operation (twelve). For optimum operation conditions, 3rd harmonic is utilized, and the corresponding phase angle values 106 are shown in FIG. 1. The machine may also be operated as a 20-pole machine by utilizing 5th harmonic, yielding a 2.5:1 harmonic mesh effect. The corresponding phase angle values 108 are shown in FIG. 1. Thus for the design shown in FIG. 1, for 'normal' optimum operation, the 'fundamental' frequency yields 12 poles. For a mesh effect operation at 20 poles, the frequency applied to the stator coils is 5/3 of this 'fundamental' and the machine may be said to be running at the 5/3 harmonic, which gives a mesh effect of 2.5:1.

This may be generalized to any high phase order induction machine in which the magnetically optimal number of poles for operation is greater than the minimum number of poles, N, permitted by coil symmetry.

Thus, for a high phase order induction machine which, because of winding symmetry considerations, will operate at a minimum of N poles, but is magnetically optimal when operating at X*N poles, and will show a mesh effect when operating at Y*N poles for harmonic operation, where $1 \leq x \leq Y$, the machine appears to be operating in the 'Y/X harmonic'. The machine is thus able to operate at the magnetic optimum (X*N poles), or at the Y/X harmonic (Y*N poles).

The title 'fractional harmonics' is an intentional misnomer. This refers to a change in pole count from one operating state to another that is not an integral multiple.

As stated previously, in general it is desirable to maintain relatively large magnetic poles, in order to reduce magnetizing losses. However larger magnetic poles introduce requirements for back iron and rotor end rings, such that for a given set of mechanical requirements and constraints, there will in general be an optimal pole count. Use of the harmonic mesh effect is associated with a change in pole count. If the 'harmonic' operating mode has a number of poles that is not an integral multiple of the optimal pole count, then this is arguably a 'fractional harmonic'.

Symmetry constraints dictate that such a machine be wound and connected such that both operating states are integral harmonics of an unused basic operating state. In general such a connection requires long end turn spans, and is only practicable in a toroidal wound machine.

For example, a machine constrained by symmetry to be a two pole machine and be capable of operating on odd harmonics only, but with back-iron, end rings, and rotor core optimized for 10 pole operation, might be used normally in '5th harmonic' mode, with '7th harmonic' utilized to engage the 'mesh effect'. Such a machine would appear to be operating in the '1.4 harmonic'.

Toroidal stator windings can be used in the present embodiment as follows. In a conventional lap or concentric winding, individual coils are placed upon the face of the airgap. Each coil presents two coil halved which interact with the airgap flux. Additionally a considerable length of 'end turn' carries current in a circumferential path along the ends of the stator, from one coil half to the other. The 'end turn' is not used magnetically.

Stator coils may also be wound in a toroidal fashion, similar to the coils on a toroidal transformer. (The direction of these coils is in fact poloidal.) Rather than having portions of conductor magnetically unused along the outer ends of the stator, the unused portion of the coil wraps around the outside of the core. Coils need not overlap in the end turn, eliminating the neck at the end of the slot. The net result is that much greater potential slot fill is possible. The magnetically unused portion of the coil must be at least as long as the conductor length in the slot. For machines that have a large length to diameter ratio or large pole count, this is a considerable disadvantage to the toroidal winding geometry. However for machines with small length to diameter ratio the toroidal winding actually results in less magnetically unused copper. Toroidal windings tend to favor the use of low pole counts, short stack lengths, and large machine diameter.

Toroidal winding will benefit some machine geometries, even if there is no intent to use harmonic drive.

Because the stator coil is localized to a single stators slot, there are no symmetry constraints associated with the coils themselves.

Coils may, of course, be interconnected to form phase sets, and in general several coils will be placed electrically in series to reduce over-all phase count. Allowed harmonics will be subject to any symmetry constraints of these interconnections. For example, coils spaced one pole pitch (180 magnetic degrees) apart may be connected in an anti-parallel fashion, introducing the same symmetry issues associated with full span windings. Adjacent coils may be connected in series, to introduce the effect of winding distribution.

In machines of 4 or more poles, coils which are 360 magnetic degrees apart may be connected without restricting the use of integral harmonics.

Figure 2:
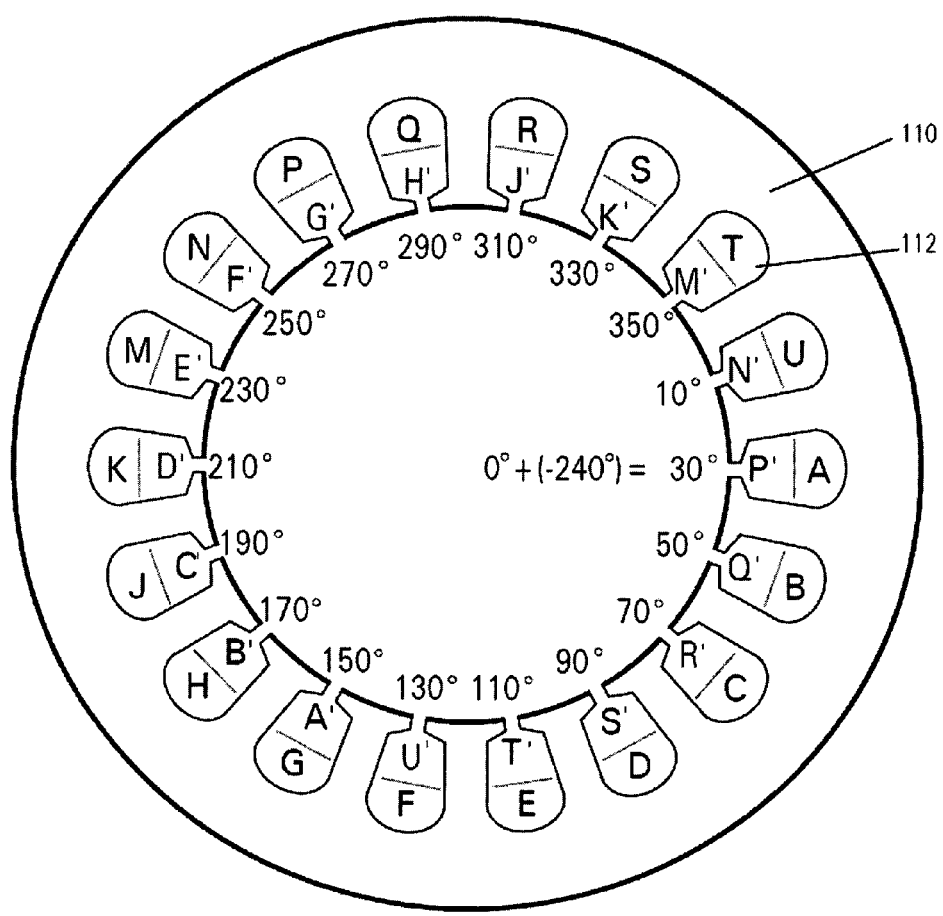
FIG. 2 shows a 9 pole distributed winding stator according to the second embodiment, supplied with fundamental frequency drive.
Figure 3:
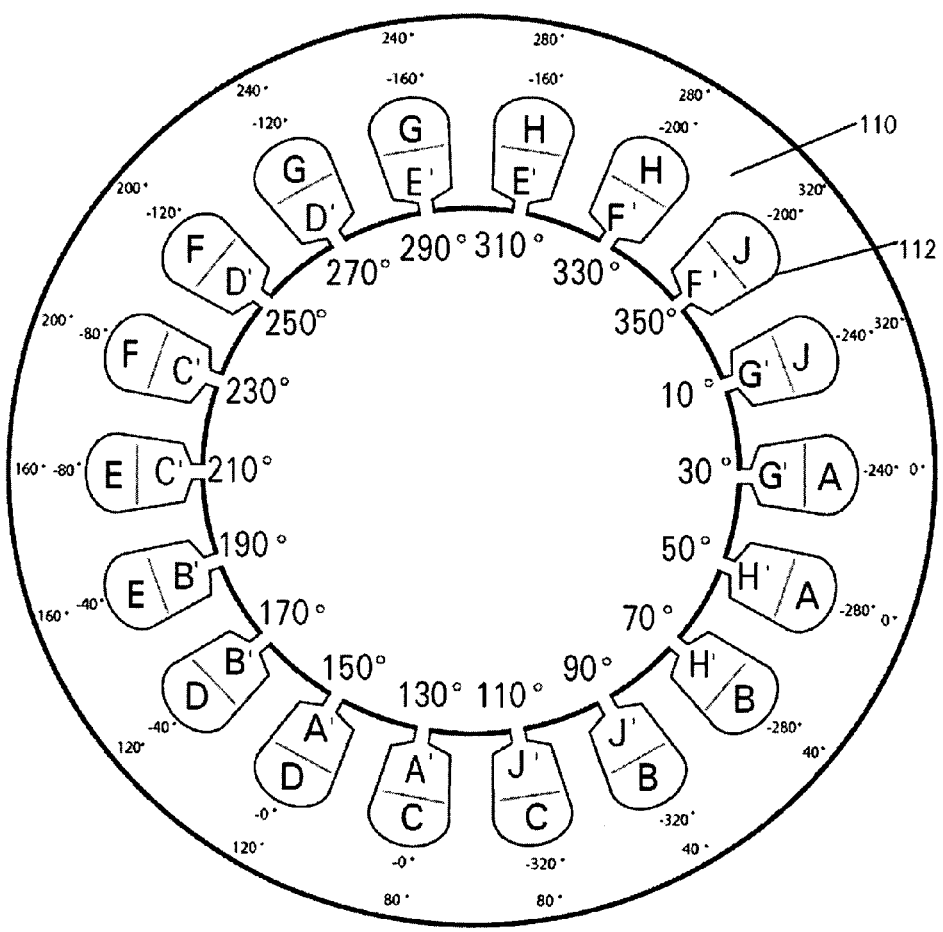
FIG. 3 shows a 9 pole distributed winding stator according to the second embodiment, supplied with 2nd harmonic drive.

In a second embodiment of the invention, a 9 phase, 18 slot, 2 pole winding is disclosed, in which each phase coil has a short pitch, preferably 100 degrees, and each phase comprises two half slot coils set into adjacent slot pairs. This is shown in FIGS. 2 and 3, which show a 2 pole stator 110 having 18 slots 112 and 9 phases. FIG. 2 shows an 18 slot, 18 phase short pitch lap wound machine. This machine is capable of operation in fundamental or second harmonic. In fundamental it develops 2 magnetic poles, in second harmonic it develops 4 magnetic poles. Pitch factor remains constant between the two operating states. FIG. 3 shows an 18 slot, 9 phase short pitch lap wound distributed machine. This machine is capable of operation in fundamental or second harmonic. The distributed winding permits a reduction in phase count, at the expense of some performance.

Figure 4:
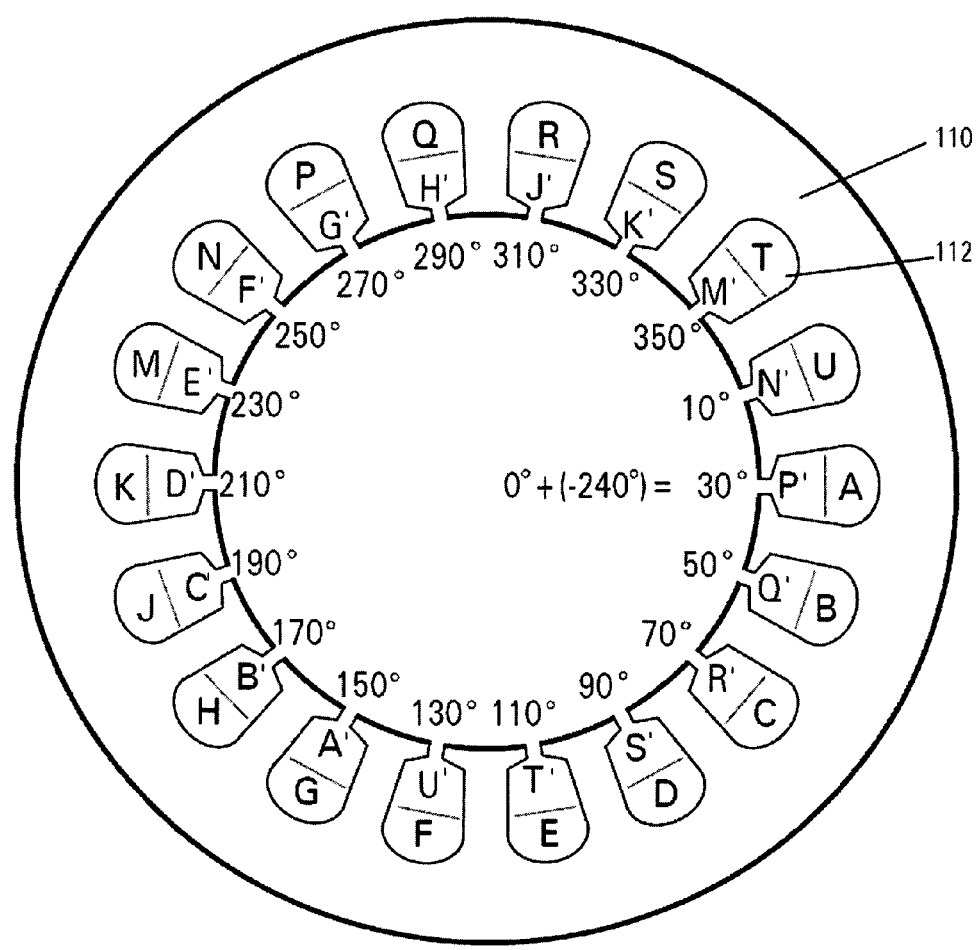
FIG. 4 shows an 18 pole concentrated winding stator according to the second embodiment, supplied with fundamental harmonic drive.
Figure 5:
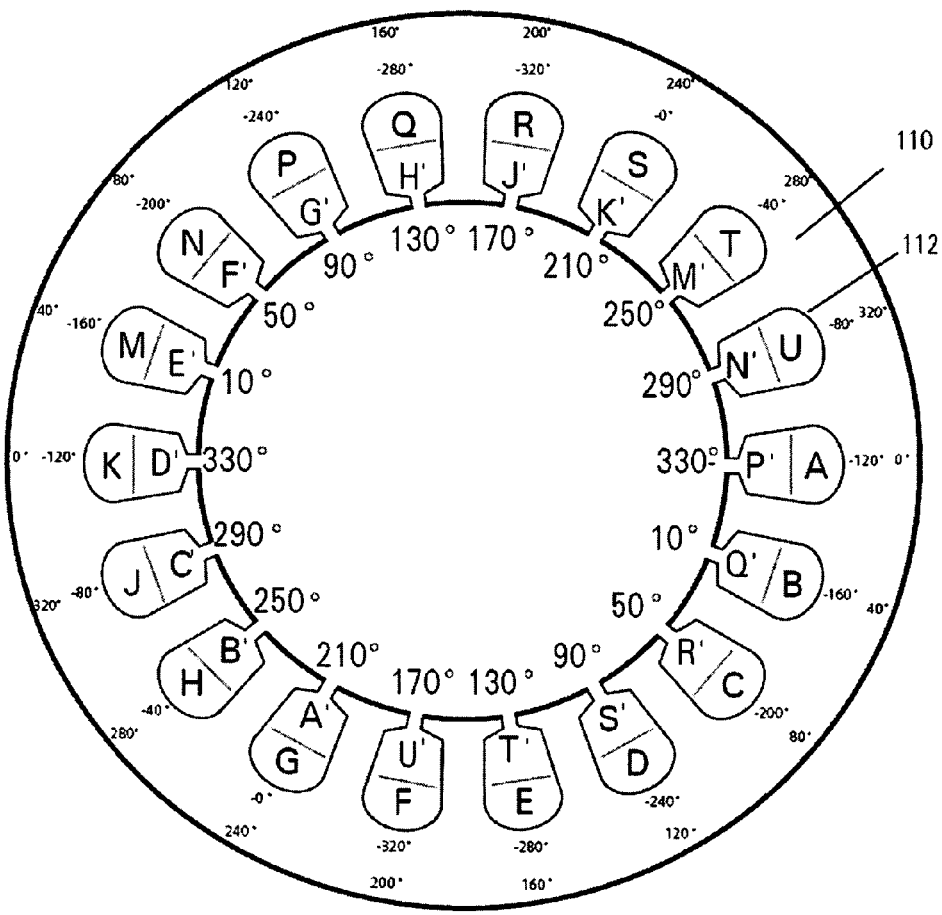
FIG. 5 shows an 18 pole concentrated winding stator according to the second embodiment, supplied with 2nd harmonic drive.

This winding may alternatively be generalized to any stator with 18*n slots and 2*n fundamental poles having short pitch windings. For example, FIG. 4 shows fundamental frequency operation of an 18 phase, 18 slot (slots labeled 112) 2 pole stator 110 having windings of pitch 120 degrees. FIG. 5 shows the same stator in $2^{nd}$ harmonic operation.

An advantage of this second embodiment is that it permits the use of the second harmonic by the use of the short pitch, but does not require a doubling of the number of inverter phases from that required by a full pitch machine. This winding can operate on fundamental and second harmonic.

In this machine, the symmetry imposed by full span windings is broken through the use of short pitch windings, preferably 100 degree span windings. Alternatively, any other known means may be used to break the symmetry imposed by full span windings, such as the use of toroidal windings and/or multiple inverters.

As a further alternative, the windings of the present embodiment may be generalized using a greater number of phases and slots per pole, or a greater number of poles where the configuration of each pole pair is similar to those of the specified 2 pole winding.

An advantage of the use of short pitch windings is that they show good winding factor for both fundamental and second harmonic.

Advantages of a 100 degree pitch are that it increases the voltage in second harmonic mode, increases the harmonic mesh effect, and reduces the packing in the end turns. The disadvantage of the 100 degree pitch is that it reduces voltage and efficiency in fundamental mode, but for large two pole motors, the reduced end turns improve efficiency sufficiently for this to be the preferred pitch for the present embodiment.

Advantages of a 120 degree pitch are that it provides the same pitch factor for both fundamental and second harmonic, and a magnetic short circuit for third harmonic. However, in the case of a 9 phase, 18 slot 2 pole motor of this embodiment, a 120 degree pitch causes a symmetry problem in second harmonic mode.

A 140 degree pitch can also be used but provides a reduced harmonic mesh effect.

Pitches longer than 120 degrees will increase the fundamental pitch factor but decrease the second harmonic pitch factor, similarly pitches shorter than 120 degrees will improve second harmonic pitch factor at the cost of fundamental pitch factor. An extremely short pitch of 90 degrees would result in unity pitch factor for second harmonic, but only 71% pitch factor for fundamental, potentially beneficial if operation in second harmonic mode is the normal operating mode.

Short pitch windings are used to permit even harmonic operation. By reducing the pitch of the windings, the problematic symmetry is broken. Even order drive currents may be used, with the anti-parallel currents from opposite winding halves supporting both fundamental and second harmonic rotating current distributions.

Changing the winding pitch from 'full span' to short pitch means that the current flowing in the coils will no longer be aligned with the resultant rotating current distribution. This results in a 'winding factor', where the resultant current flow reduced from the actual coil current. Frequently two coils with different phase will share the same slot, the net slot current becomes the vector sum of the two coil currents, and the magnitude of this sum current is less than the sum of the magnitudes of the individual coil currents.

The winding pitch factor for a 120 degree winding is 0.866, meaning that the net slot current magnitude will be 0.866 times the sum of the coil current magnitudes. When operated using second harmonic drive current, the winding pitch relative to the harmonic pole spacing is 240 degrees. The pitch factor for harmonic operation is still 0.866. Thus a 120 degree span winding will show good winding factor for both fundamental and second harmonic. Depending upon machine geometry, the reduced efficiency associated with the 0.866 winding factor may be more than made up by the reduced end turn length, in addition to the ability to use even harmonics. Note that this winding pitch introduces a C-3 symmetry, which will prevent the use of third harmonic.

Breaking the C-2 symmetry that prevents the use of even harmonics is possible with pitches other than 120 degrees. Relevant factors are the desired number of phases, trade-off between machine efficiency in fundamental versus harmonic mode, and desired terminal voltage change when using the 'harmonic mesh effect'. Pitches longer than 120 degrees will increase the fundamental pitch factor but decrease the second harmonic pitch factor, similarly pitches shorter than 120 degrees will improve second harmonic pitch factor at the cost of fundamental pitch factor. An extremely short pitch of 90 degrees would result in unity pitch factor for second harmonic, but only 71% pitch factor for fundamental, potentially beneficial if operation in second harmonic mode is the normal operating mode.

The full span concentrated windings made explicit use of the anti-parallel relationship between opposite coil halves to reduce the number of independent phases required for a given number of slots. Full slot coils may be used, but because the winding symmetry matches the desired current distribution, adjacent slots will remain in correct relative phase.

Moving to short pitch windings removes this benefit. If short pitch full slot coils are used, than adjacent slots will not have correct relative phase. While the over-all current distribution will be correct, a high pole count error term will be introduced. In general, moving to short pitch windings implies a doubling of phase count or adding winding distribution.

These are shown in FIGS. 4 and 5, which shows a 9 phase 18 slot 2 pole machine running on fundamental and second harmonic respectively, and in Table 3.

TABLE 3 variations of a 9 phase 18 slot 2 pole machine running on fundamental and second harmonic.

| Slot | AngM | Coil | AngE | Net | AngE2 | Net2 | Coil | AngE | AngE2 | Coil | AngE | Net | AngE2 | Net2 |
|---|---|---|---|---|---|---|---|---|---|---|---|---|---|---|
| 1 | 0 | A P' | 000<br>060 | 030 | 000<br>300 | 330 | A | 000 | 000 | A G' | 000<br>060 | 030 | 000<br>300 | 330 |
| 2 | 20 | B Q' | 020<br>080 | 050 | 040<br>340 | 010 | H' | 100 | 020 | A H' | 000<br>100 | 050 | 000<br>020 | 010 |
| 3 | 40 | C R' | 040<br>100 | 070 | 080<br>020 | 050 | B | 040 | 080 | B H' | 040<br>100 | 070 | 080<br>020 | 050 |
| 4 | 60 | D S' | 060<br>120 | 090 | 120<br>060 | 090 | J' | 140 | 100 | B J' | 040<br>140 | 090 | 080<br>100 | 090 |
| 5 | 80 | E T' | 080<br>140 | 110 | 160<br>100 | 130 | C | 080 | 160 | C J' | 080<br>140 | 110 | 160<br>100 | 130 |
| 6 | 100 | F U' | 100<br>160 | 130 | 200<br>140 | 170 | A' | 180 | 180 | C A' | 080<br>180 | 130 | 160<br>180 | 170 |
| 7 | 120 | G A' | 120 | 150 | 240 | 210 | D | 120 | 240 | D A' | 120 | 150 | 240 | 210 |

TABLE 3-continued variations of a 9 phase 18 slot 2 pole machine running on fundamental and second harmonic.

| Slot | AngM | Coil | AngE | Net | AngE2 | Net2 | Coil | AngE | AngE2 | Coil | AngE | Net | AngE2 | Net2 |
|------|------|------|------|-----|-------|------|------|------|-------|------|------|-----|-------|------|
|      |      |      | 180  |     | 180   |      |      |      |       |      | 180  |     | 180   |      |
| 8    | 140  | H B' | 140  | 170 | 280   | 250  | B'   | 220  | 260   | D B' | 120  | 170 | 240   | 250  |
|      |      |      | 200  |     | 220   |      |      |      |       |      | 220  |     | 260   |      |
| 9    | 160  | J C' | 160  | 190 | 320   | 290  | E    | 160  | 320   | E B' | 160  | 190 | 320   | 290  |
|      |      |      | 220  |     | 260   |      |      |      |       |      | 220  |     | 260   |      |
| 10   | 180  | K D' | 180  | 210 | 000   | 330  | C'   | 260  | 340   | E C' | 160  | 210 | 320   | 330  |
|      |      |      | 240  |     | 300   |      |      |      |       |      | 260  |     | 340   |      |
| 11   | 200  | M E' | 200  | 230 | 040   | 010  | F    | 200  | 040   | F C' | 200  | 230 | 040   | 010  |
|      |      |      | 260  |     | 340   |      |      |      |       |      | 260  |     | 340   |      |
| 12   | 220  | N F' | 220  | 250 | 080   | 050  | D'   | 300  | 060   | F D' | 200  | 250 | 040   | 050  |
|      |      |      | 280  |     | 020   |      |      |      |       |      | 300  |     | 060   |      |
| 13   | 240  | P G' | 240  | 270 | 120   | 090  | G    | 240  | 120   | G D' | 240  | 270 | 120   | 090  |
|      |      |      | 300  |     | 060   |      |      |      |       |      | 300  |     | 060   |      |
| 14   | 260  | Q H' | 260  | 290 | 160   | 130  | E'   | 340  | 140   | G E' | 240  | 290 | 120   | 130  |
|      |      |      | 320  |     | 100   |      |      |      |       |      | 340  |     | 140   |      |
| 15   | 280  | R J' | 280  | 310 | 200   | 170  | H    | 280  | 200   | H E' | 280  | 310 | 200   | 170  |
|      |      |      | 340  |     | 140   |      |      |      |       |      | 340  |     | 140   |      |
| 16   | 300  | S K' | 300  | 330 | 240   | 210  | F'   | 020  | 220   | H F' | 280  | 330 | 200   | 210  |
|      |      |      | 000  |     | 180   |      |      |      |       |      | 020  |     | 220   |      |
| 17   | 320  | T M' | 320  | 350 | 280   | 250  | J    | 320  | 280   | J F' | 320  | 350 | 280   | 250  |
|      |      |      | 020  |     | 220   |      |      |      |       |      | 020  |     | 220   |      |
| 18   | 340  | U N' | 340  | 010 | 320   | 290  | G'   | 060  | 300   | J G' | 320  | 010 | 280   | 290  |
|      |      |      | 040  |     | 260   |      |      |      |       |      | 060  |     | 300   |      |
|      | span | Span |      |     |       |      | span | span |       |      |      |     |       | 0.985 |
|      | 120 Kp | 240 Kp |   |     |       |      | 100 Kp | 200 |     |      |      |     |       |      |
|      | 0.866 | 0.866 |    |     |       |      | 0.766 | Kp  |     |      |      |     |       |      |

With the 9 phase full slot coils, the high pole count superimposed current distribution is obvious by inspection. Using partial slot coils, either by increasing phase count or by distribution phases to adjacent coils, can eliminate these high pole count errors.

Alternatively, the machine uses a non-wound slot drive, and toroidal windings which localize coils to individual slots. To use a non-wound stator, it is not necessary to use windings to provide the stator current distribution. A single conductor may be used in a single slot, with no 'winding'. Such a stator would be electrically similar to the rotor bars of a standard squirrel cage rotor. The symmetry constraints caused by winding span are thus eliminated, and even or odd harmonics may be used. However, Such a stator is almost certainly not practical, because of the extremely high current and low voltage that such single inductors would require. For extremely large or high speed machines, the voltage placed on a single conductor might be large enough to justify a 'non-wound' stator, however the necessary external connections would dictate operation at higher voltage. Non-wound stators have been mentioned in the patent literature.

The invention claimed is:

1. A high phase order induction machine including a stator with a plurality of poles and slots with windings comprising toroidally wound coils located in said slots to have a selected pole symmetry and pitch, wherein said machine is an induction motor configured so that a magnetically optimal number of poles for operation X*N is greater than a minimum number of poles N permitted by said selected coil symmetry; said motor shows a mesh effect when operating at Y*N poles; and said motor operates in fundamental or harmonic frequency at fewer than said magnetically optimal number of poles, X, Y, and N being integers and 1<X<Y.

2. The high phase order induction machine of claim 1, wherein said coil symmetry is broken by including a non-wound slot drive and said motor operates in second harmonic.

3. The high phase order induction machine of claim 1 wherein each phase comprises two half slot coils set into adjacent slots.

4. The high phase order induction machine of claim 3, said toroidal windings being selected to comprise a 9 phase 18 slot 2 pole winding.

5. The high phase order induction machine of claim 1, wherein said toroidally wound coils are wound around a stator core.

6. The high phase order induction machine of claim 1, wherein said motor is configured to operate in odd harmonic frequencies to show a mesh effect at Y*N poles in harmonic operation when said motor operates optimally in a $Y/X^{th}$ harmonic mode.

7. The high phase order induction machine of claim 6, wherein N is 2, X is 5, and Y is 7, and said motor appears to operate in a 1.4 fractional harmonic mesh effect.

8. The high phase order induction machine of claim 6, wherein said stator has 72 slots and windings having 18 phases, wherein N is 4, X is 3 and Y is 5, and said machine appears to operates in a 2.5:1 fractional harmonic mesh effect.

9. The high phase order induction machine of claim 1, wherein said motor operates in a fundamental frequency.

10. The high phase order induction machine of claim 1, wherein said windings are short pitch windings, a symmetry imposed by full span windings is broken, and said motor operates in second harmonic frequency.

11. The high phase order induction machine of claim 10 having a pitch of 120 rotational degrees.

12. The high phase order induction machine of claim 10 having a pitch of 100 rotational degrees.

13. The high phase order induction machine of claim 10 having a pitch of 90 rotational degrees.

14. The high phase order induction machine of claim 1, wherein N=4 and X=3, said windings have 4 pole symmetry, said stator is optimized for 12 pole operation so that the minimum number of poles permitted by coil symmetry is less than the optimum number of poles for operation, and said machine has 72 slots and 18 phases and is only operated in a 3$^{rd}$ or 5$^{th}$ harmonic with a 2.53:1 harmonic mesh effect.

15. A high phase order induction machine comprising a 9 phase, 18 slot, 2 pole winding, wherein a coil of each phase is toroidally wound and has a short pitch of 100 or 120 degrees, each phase comprises two half slot coils set into adjacent slot pairs, and said machine operates in fundamental or second harmonic mode without doubling inverter phase number.

* * * * *